US007684583B2

(12) United States Patent
Yang

(10) Patent No.: US 7,684,583 B2
(45) Date of Patent: *Mar. 23, 2010

(54) IN-EAR TYPE AND EAR-PLUG TYPE EARPHONE WITH ADJUSTABLE VOLUME OF FRONT CHAMBER BETWEEN SPEAKER AND HOUSING

(75) Inventor: Bill Yang, Taipei (TW)

(73) Assignee: Cotron Corporation, Taipei (TW)

( * ) Notice: Subject to any disclaimer, the term of this patent is extended or adjusted under 35 U.S.C. 154(b) by 655 days.

This patent is subject to a terminal disclaimer.

(21) Appl. No.: 11/530,029

(22) Filed: Sep. 8, 2006

(65) Prior Publication Data

US 2008/0013772 A1 Jan. 17, 2008

(30) Foreign Application Priority Data

Jun. 29, 2006 (TW) .............................. 95123493 A

(51) Int. Cl.
*H04R 25/00* (2006.01)
*H04M 1/00* (2006.01)
*H04M 9/00* (2006.01)

(52) U.S. Cl. ....................................... 381/370; 379/430

(58) Field of Classification Search ................. 370/430; 381/370, 376, 380; 181/129, 130, 135
See application file for complete search history.

(56) References Cited

U.S. PATENT DOCUMENTS

2006/0045284 A1* 3/2006 Haussmann et al. ........... 381/72

FOREIGN PATENT DOCUMENTS

JP S5256519 5/1977
JP S6293894 6/1987

* cited by examiner

*Primary Examiner*—Tuan D Nguyen
(74) *Attorney, Agent, or Firm*—Jianq Chyun IP Office

(57) ABSTRACT

An earphone with adjustable volume of a front chamber between a speaker and a housing is provided, which includes a speaker unit, a housing and a movable element. The speaker unit is disposed within the housing, and the housing includes an earplug formation formed in front of the speaker unit. A chamber within the earplug formation has a volume, and the movable element is disposed on the housing and moves correspondingly with the chamber, so as to adjust the volume of the chamber. Therefore, the frequency response of the sound sent by the speaker unit varies depending upon the variation of the volume of the chamber.

10 Claims, 4 Drawing Sheets

IN-EAR TYPE AND EAR-PLUG TYPE EARPHONE WITH ADJUSTABLE VOLUME OF FRONT CHAMBER BETWEEN SPEAKER AND HOUSING

CROSS-REFERENCE TO RELATED APPLICATION

This application claims the priority benefit of Taiwan application serial no. 95123493, filed Jun. 29, 2006. All disclosure of the Taiwan application is incorporated herein by reference.

BACKGROUND OF THE INVENTION

1. Field of Invention

The present invention relates to an earphone, and more particularly, to an earphone with adjustable volume of a front chamber between a speaker and a housing.

2. Description of Related Art

With the rapid progress of the science and technology, the electronic product has gradually become light, chic and miniaturized, and people can use the miniaturized electronic products, such as radio or walkman, at anytime and anywhere. Moreover, the personal digital product, such as common MP3 walkmans, cell phones, personal digital assistants (PDAs) or notebooks, has increasingly become popular, and thus being indispensable in the daily life. In addition, the cell phone integrated with functions of both radio and MP3 has immerged.

No matter what kind of electronic products, the earphone has become an essential fitting for the electronic product, so that the user can listen to the sound information provided by the electronic product without interfering others. Moreover, the earphone also provides a preferable sound transmission for the listener, such that he/she can hear and understand the content of the sound more clearly, unlike the circumstance that the sound is unclear when transmitting from computer speakers. Especially, when the user is moving, for example, when doing exercises, driving, conducting acute motions or in a noisy environment, since the earphone is used, the sound transmission will not be influenced.

However, since the size and structure of the ear and the ear canal are different from person to person, and a different person has a different favor for the music, thus, the judgment for the sound quality of the earphone varies as for different persons, and it is hard to meet the requirements of each person. Meanwhile, the frequency response curve of most earphones available in the market is fixed, and if the frequency response on high tone portion or low tone portion of the signal is to be changed, it requires changing the distribution characteristics of the sound field by an electronic equalizer or relevant software. Even though the additional electronic equalizer may change the frequency response of the earphone, the time delay caused by the inductance or capacitance within the electronic equalizer cannot be compensated. Therefore, it is an unavoidable task to improve the structure of the earphone.

SUMMARY OF THE INVENTION

An object of the present invention is to provide an earphone with adjustable volume of a front chamber between a speaker and a housing, so as to change the sound field characteristic of the earphone body in terms of the structure.

The present invention provides an earphone with adjustable volume of a front chamber between a speaker and a housing, which comprises a speaker unit, a housing and a movable element. The speaker unit is disposed within the housing having an earplug formation formed in front of the speaker unit. The earplug formation has a chamber, and the chamber has a volume. The movable element is disposed on the earplug formation and moves correspondingly with the chamber, so as to adjust the volume of the chamber.

According to an embodiment of the present invention, the movable element comprises an inner sleeve, which is disposed within the chamber and suitable for extending out of the earplug formation. Moreover, the housing correspondingly has a locking part for being locked with the outer surface of the inner sleeve.

According to an embodiment of the present invention, the earphone further comprises an ear cushion for covering the earplug formation and the inner sleeve. Moreover, the inner sleeve correspondingly has at least one phonating hole exposed from the ear cushion.

According to an embodiment of the present invention, the movable element comprises an outer sleeve extending out of the earplug formation. Moreover, the housing correspondingly has a locking part for being locked with the inner surface of the outer sleeve.

According to an embodiment of the present invention, the earphone further comprises an ear cushion for covering the earplug formation and the outer sleeve. Moreover, the outer sleeve correspondingly has at least one phonating hole exposed from the ear cushion.

The present invention employs the movable structure for adjusting the volume of the chamber, and the movable structure moves relatively to the chamber via the movable inner sleeve or outer sleeve, so as to change the volume of the chamber. Therefore, each person may adjust the frequency response of the earphone body directing to different music, such that the earphone may meet different customers' requirements.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
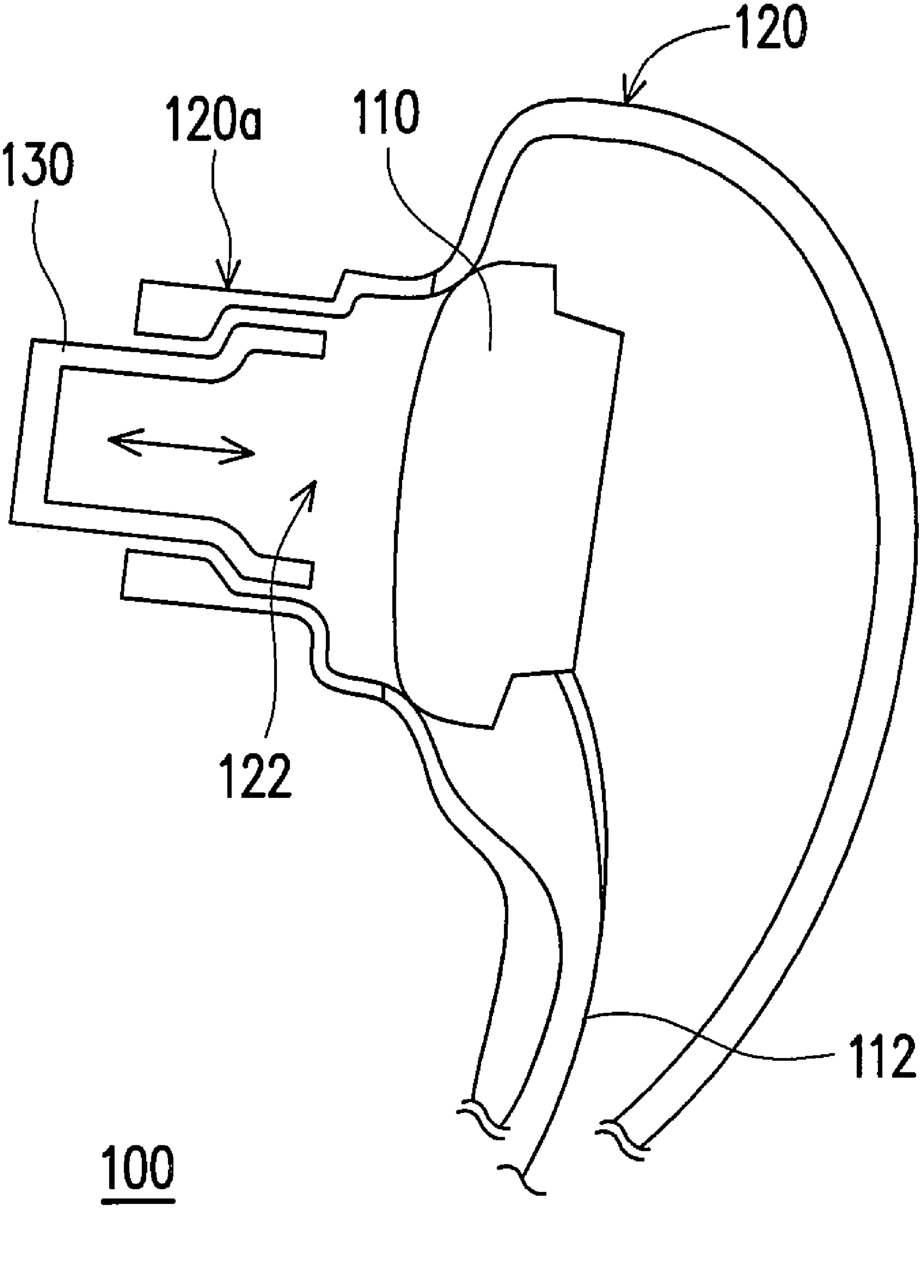
FIG. 1 is a schematic cross-sectional view of an earphone with adjustable volume of a front chamber for a speaker according to an embodiment of the present invention.

Referring to FIG. 1, it is a schematic cross-sectional view of an earphone with adjustable volume of a front chamber between a speaker and a housing according to an embodiment of the present invention. A speaker unit 110 is disposed within the housing 120, and is electrically connected to an external host (e.g., MP3 player, cell phone, walkman or computer etc.) via the transmission line 112, such that the speaker unit 110 can send out sound information that is acceptable for the human ear. The inner structure of the speaker unit 110 is not shown in FIG. 1. The profile size of the speaker unit 110 substantially matches with the volume of the internal chamber of the earphone housing 120, and the speaker unit 110 can be inserted into the cochlea of the human ear (not shown), thus, this type of earphone 100 is generally referred as an ear-plug type earphone or an in-ear type earphone. However, the earphone 100 with adjustable volume of a front chamber between a speaker and a housing may be widely applied in various types of earphones, and is not limited to the ear-plug type earphone or the in-ear type earphone as shown in FIG. 1.

As shown in FIG. 1, the earphone housing 120 forms an earplug formation 120*a* in front of the speaker unit 110, and there is a chamber 122 in the earplug formation 120*a* for generating a resonance effect, such that the sound field properties of the voice sent by the speaker unit 110 are different in the front chamber 122. For example, the frequency response of high tone portion or low tone portion is changed to make either the high tone portion or the low tone portion outstanding on the curve of the frequency response. Generally, when designing the sound field property of the earphone, the actual volume of the front chamber 122 is also taken into consideration in order to analyze the influence of the volume of the front chamber 122 to the frequency response of high tone portion or low tone portion.

Figure 2:
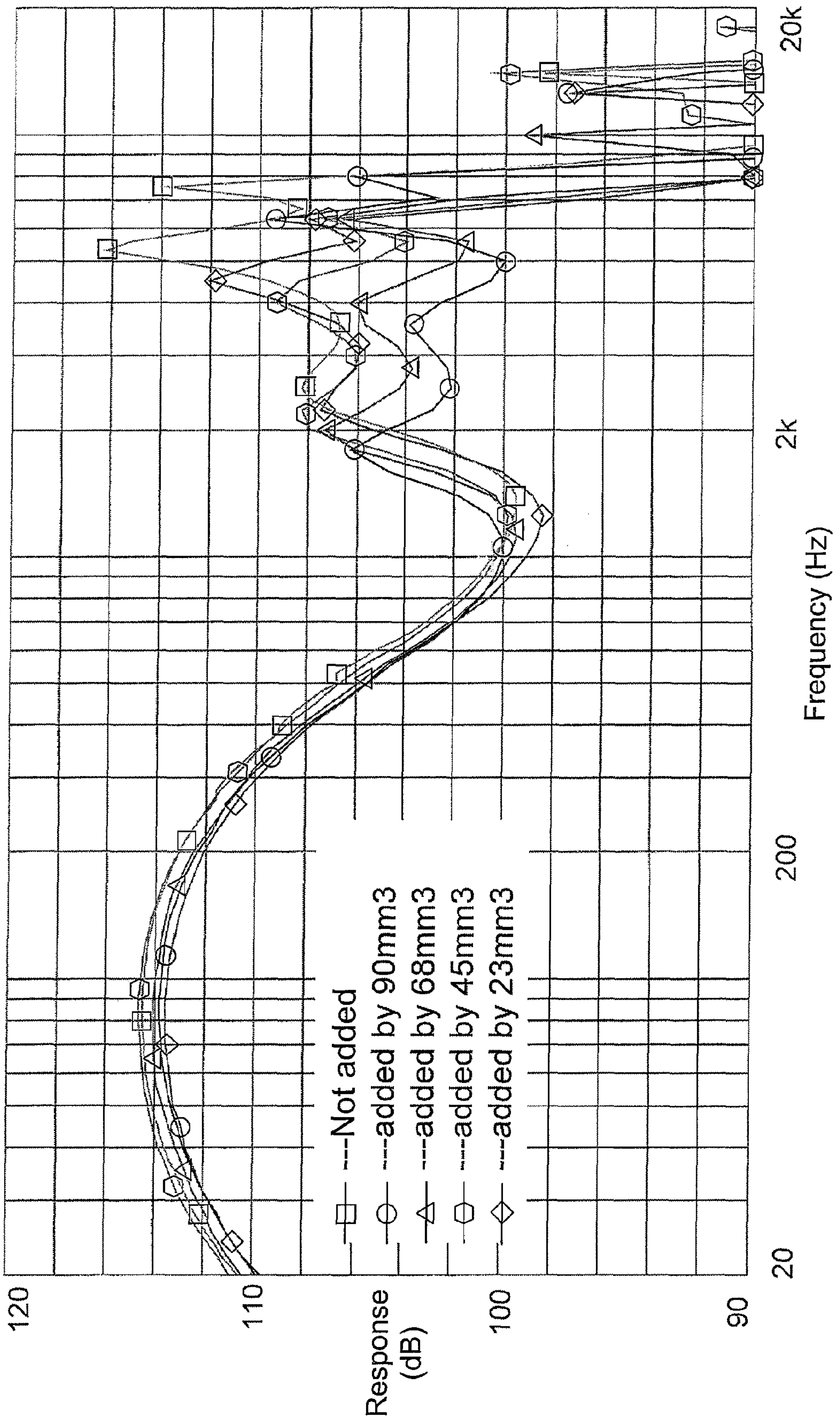
FIG. 2 is a frequency response curve diagram of the volume variation of the front chamber on the sound field characteristic of the earphone.

Referring to FIG. 2, it is a frequency response curve diagram of the volume variation of the front chamber on the sound field characteristic of the earphone. Difference frequency response curves are presented with different symbols. Within the audio frequency range that can be heard by human ear (20 Hz-20 KHz), it is known from the result of an artificial ear test that, as the increase of the volume of the front chamber (from 23 $mm^3$ to 90 $mm^3$), the frequency response of the high frequency part will be changed. Therefore, the frequency response curve diagrams for the front chambers with different volumes are different. If the front chamber 122 only has a fixed volume, and the volume cannot be adjusted as desired, the function of the front chamber 122 is restricted, thus, the performance cannot be further improved.

Figure 3:
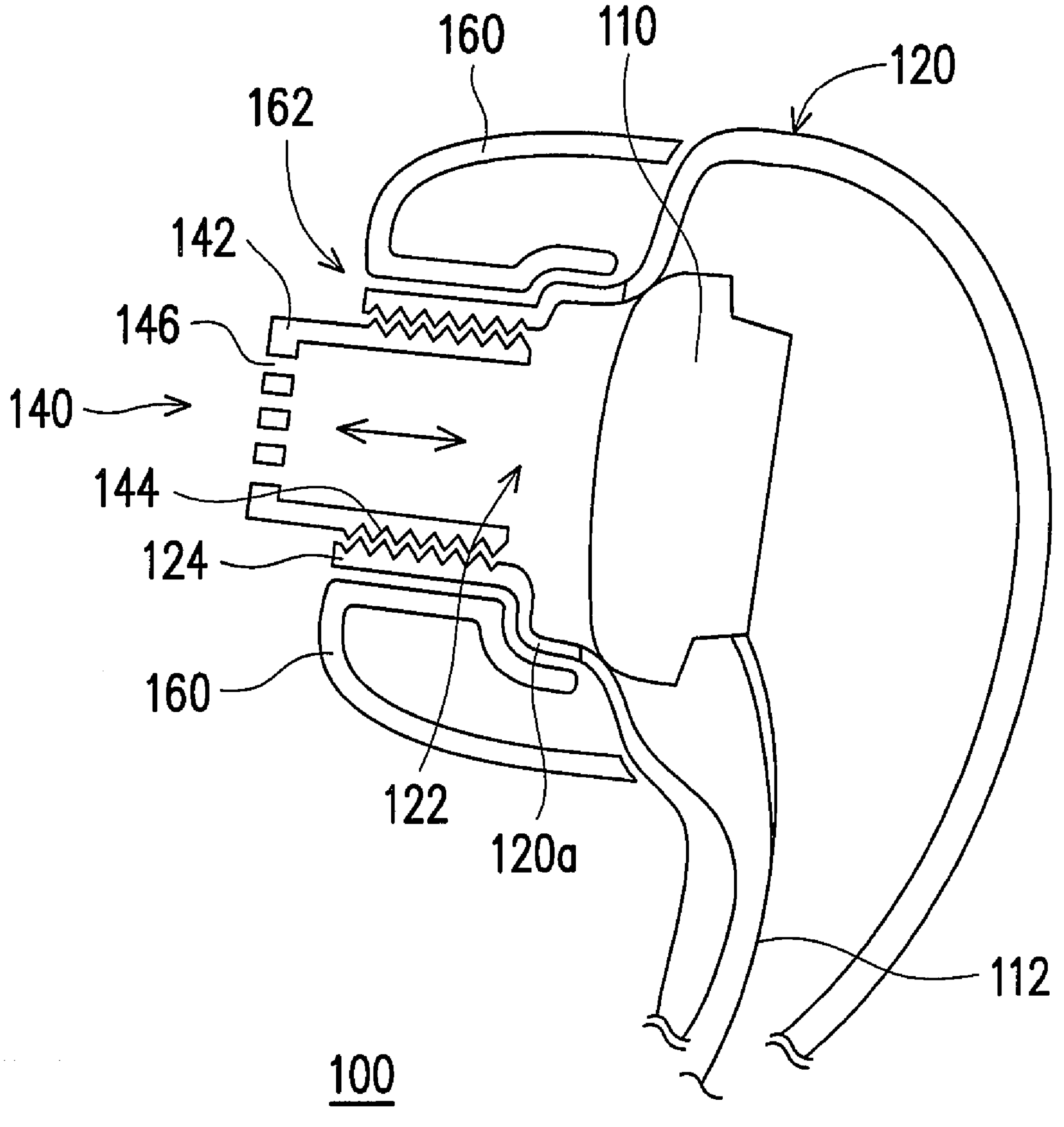
FIGS. 3 and 4 are respectively schematic views of a movable element according to another two embodiments of the present invention.
Figure 4:
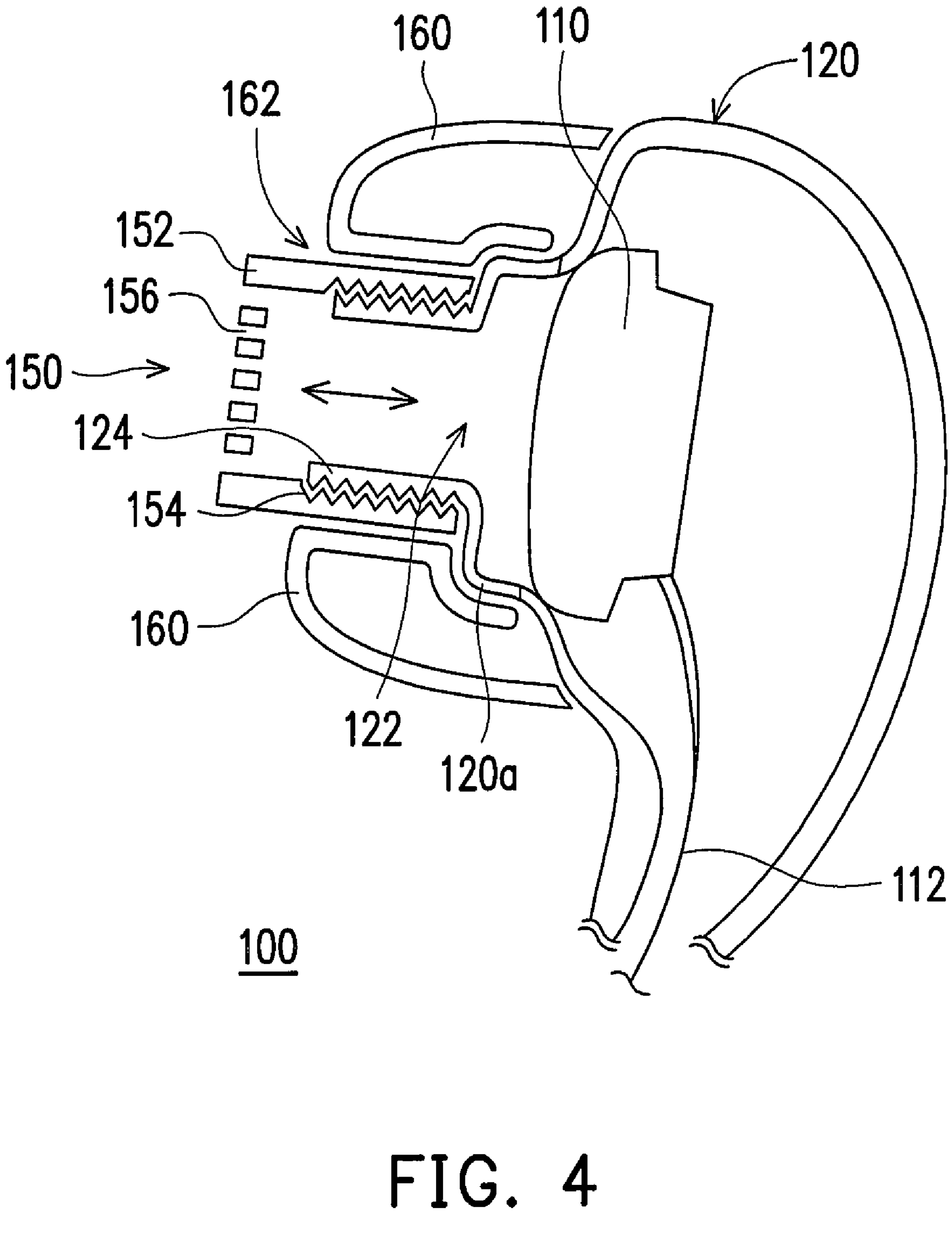

Therefore, the earphone 100 of the present invention employs a movable structure for adjusting the volume of the front chamber between the speaker and the housing, and the movable element 130 moves relatively to the front chamber 122, so as to overcome the above problem. As shown in FIG. 1, the movable element 130 is disposed within the chamber 122 of the earplug formation, and movably extends out of the earplug formation 120*a*, thereby increasing the volume of the front chamber 122. The movable element 130 is, for example, a sleeve with a smooth surface and firmly contacted with the sidewall of the earplug formation 120*a*. Under an external force, the movable element 130 stretches freely along the direction for applying the external force. FIG. 3 and FIG. 4 are schematic views of the movable element according to another two embodiments of the present invention respectively.

As shown in FIG. 3, the movable element 140 comprises an inner sleeve 142 disposed within the front chamber 122 for adjusting the volume of the front chamber 122. Moreover, the outer surface of the inner sleeve 142 further has a first locking part 144 (e.g., threaded part), and the inner wall of the earphone housing 120 correspondingly has a second locking part 124 (e.g., threaded part). The two locking parts are locked with each other, so that the inner sleeve 142 is screwed out with respect to the front chamber 122 and extends out of the housing 120 along the axial direction, thereby increasing the volume of the front chamber 122. When the inner sleeve 142 is screwed into the front chamber 122, the volume of the front chamber 122 is reduced.

Moreover, an ear cushion 160 is further disposed on the earplug formation 120*a* of the housing 120 for annularly covering the earplug formation 120*a* and the inner sleeve 142, which may be inserted into the cochlea for preventing external noises from entering into the ear. The material of the ear cushion 160 is soft rubber, such that the user may not feel uncomfortable after a long time of use. Moreover, except that the inner sleeve 142 is used for adjusting the volume of the front chamber 122, one or more phonating holes 146 may be disposed to expose from the opening 162 of the ear cushion 160, so as to make the sound of the speaker unit 110 reach the inner of the ear from the phonating hole 146.

Next, referring to FIG. 4, the movable element 150 comprises an outer sleeve 152 disposed out of the earphone housing 120 for adjusting the volume of the front chamber 122. Moreover, the inner surface of the outer sleeve 152 further has a first locking part 154 (e.g., threaded part), and the outer wall of the earphone housing 120 correspondingly has a second locking part 124 (e.g., threaded part). The two locking parts are locked with each other, so that the outer sleeve 152 is screwed out with respect to the front chamber 122 and extends out of the housing 120 along the axial direction, thereby increasing the volume of the front chamber 122. When the outer sleeve 152 is screwed into the front chamber 122, the volume of the front chamber 122 is reduced.

Similarly, an ear cushion 160 is further disposed on the earplug formation 120*a* of the housing 120 for annularly covering the earplug formation 120*a* and the outer sleeve 152, which may be inserted into the cochlea for preventing external noises from entering into the ear. The material of the ear cushion 160 is soft rubber, such that the user may not feel uncomfortable after a long time of use. Moreover, except that the outer sleeve 152 is used for adjusting the volume of the front chamber 122, one or more phonating holes 156 may be disposed to expose from the opening 162 of the ear cushion 160, so as to make the sound of the speaker unit 110 reach the inner of the ear from the phonating hole 156.

To sum up, the earphone with adjustable volume of a front chamber between a speaker and a housing according to the present invention comprises a speaker unit, a housing and a movable element, wherein the movable element is disposed within or out of the housing, and moves with respect to the front chamber between the speaker unit and the housing, so as to adjust the volume of the front chamber, which no longer has only one fixed volume. The sound field characteristic of the sound from the speaker unit in the front chamber varies depending upon different volume of the front chamber, thus, the present invention changes the sound field characteristic of the earphone by using a movable structure for adjusting the volume of the front chamber between the speaker and the housing in terms of the structure of the earphone body. Therefore, each person may adjust the frequency response of the earphone body directing to different music, such that the earphone can meet different customers' requirements.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An earphone with adjustable volume of a front chamber between a speaker and a housing, comprising:

a speaker unit;

a housing, covering the speaker unit, and having an earplug formation formed in front of the speaker unit, wherein the earplug formation has a chamber and the chamber has a volume; and a movable element, disposed on the earplug formation and moving correspondingly with the chamber for adjusting the volume of the chamber.

2. The earphone with adjustable volume of a front chamber between a speaker and a housing as claimed in claim 1, wherein the movable element comprises an inner sleeve disposed within the chamber and suitable for extending out of the earplug formation.

3. The earphone with adjustable volume of a front chamber between a speaker and a housing as claimed in claim 2, wherein the earplug formation correspondingly has a locking part for locking with the outer surface of the inner sleeve.

4. The earphone with adjustable volume of a front chamber between a speaker and a housing as claimed in claim 2, further comprising an ear cushion for covering the earplug formation and the inner sleeve.

5. The earphone with adjustable volume of a front chamber between a speaker and a housing as claimed in claim 4, wherein the inner sleeve correspondingly has at least one phonating hole exposed from the ear cushion.

6. The earphone with adjustable volume of a front chamber between a speaker and a housing as claimed in claim 1, wherein the movable element comprises an outer sleeve disposed out of the earplug formation.

7. The earphone with adjustable volume of a front chamber between a speaker and a housing as claimed in claim 6, wherein the housing correspondingly has a locking part for locking with the inner surface of the outer sleeve.

8. The earphone with adjustable volume of a front chamber between a speaker and a housing as claimed in claim 6, further comprising an ear cushion for covering the earplug formation and the movable element.

9. The earphone with adjustable volume of a front chamber between a speaker and a housing as claimed in claim 8, wherein the outer sleeve correspondingly has at least one phonating hole exposed from the ear cushion.

10. The earphone with adjustable volume of a front chamber between a speaker and a housing as claimed in claim 1, wherein the size of the speaker unit is suitable for being inserted into an ear.

* * * * *